US009574654B2

(12) United States Patent
Lundberg

(10) Patent No.: US 9,574,654 B2
(45) Date of Patent: Feb. 21, 2017

(54) HYDRAULIC CONTROL SYSTEM WITH ETRS FOR A CONTINUOUSLY VARIABLE TRANSMISSION

(71) Applicant: GM Global Technology Operations LLC, Detroit, MI (US)

(72) Inventor: Philip C. Lundberg, Keego Harbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 427 days.

(21) Appl. No.: 14/293,218

(22) Filed: Jun. 2, 2014

(65) Prior Publication Data

US 2014/0360302 A1    Dec. 11, 2014

Related U.S. Application Data

(60) Provisional application No. 61/831,366, filed on Jun. 5, 2013.

(51) Int. Cl.
| | |
|---|---|
| *F16H 59/00* | (2006.01) |
| *F16H 61/00* | (2006.01) |
| *F16H 63/00* | (2006.01) |
| *F16H 63/34* | (2006.01) |
| *F16H 61/14* | (2006.01) |
| *F16H 61/662* | (2006.01) |

(52) U.S. Cl.
CPC .......... *F16H 61/0021* (2013.01); *F16H 61/14* (2013.01); *F16H 61/66259* (2013.01); *F16H 61/66272* (2013.01); *F16H 63/3483* (2013.01); *Y10T 74/20024* (2015.01)

(58) Field of Classification Search
CPC .................... F16H 61/66259; F16H 61/66272; F16H 61/12; F16H 61/0021; F16H 61/0206

USPC ............................................... 474/28; 477/39
See application file for complete search history.

(56) References Cited

U.S. PATENT DOCUMENTS

| | | | | |
|---|---|---|---|---|
| 4,642,069 A | * | 2/1987 | Sawada .................. | F16H 61/662 474/28 |
| 4,653,353 A | * | 3/1987 | Itoh .................... | F16H 61/66259 477/49 |
| 4,685,357 A | * | 8/1987 | Sawada ............. | F16H 61/66272 477/45 |
| 4,699,604 A | * | 10/1987 | Yokoyama ............ | B60W 30/18 474/18 |
| 4,702,725 A | * | 10/1987 | Kouno .................... | F16H 61/66 474/18 |
| 4,712,453 A | * | 12/1987 | Haley ................... | B60W 10/02 477/163 |
| 4,718,308 A | * | 1/1988 | Haley .................. | B60W 10/02 474/28 |

(Continued)

FOREIGN PATENT DOCUMENTS

CN        102121528 A        7/2011

OTHER PUBLICATIONS

U.S. Appl. No. 14/269,801, filed May 5, 2014, by Philip C. Lundberg. All Pages.

*Primary Examiner* — Henry Liu

(57) ABSTRACT

A hydraulic control system for a CVT includes a pressure regulator subsystem, a ratio control subsystem, a torque converter control (TCC) subsystem, a clutch control subsystem, an electronic transmission range selection subsystem, and is enabled for automatic engine start/stop (ESS) functionality.

20 Claims, 6 Drawing Sheets

(56) References Cited

U.S. PATENT DOCUMENTS

| | | | | |
|---|---|---|---|---|
| 4,772,249 A * | 9/1988 | Kouno | ............... | B60W 30/18 474/28 |
| 4,778,435 A * | 10/1988 | Sugaya | ............... | B60W 30/18 474/18 |
| 4,857,034 A * | 8/1989 | Kouno | ............... | B60W 30/18 474/28 |
| 7,487,866 B2 * | 2/2009 | Kruse | ............... | F16D 25/123 192/113.3 |
| 8,066,595 B2 * | 11/2011 | Ogata | ............... | F16H 61/0021 474/103 |
| 8,070,650 B2 * | 12/2011 | Ogata | ............... | F16H 61/12 475/210 |
| 8,287,409 B2 * | 10/2012 | Ogata | ............... | F16H 61/12 474/12 |
| 8,360,907 B2 * | 1/2013 | Ogata | ............... | F16H 61/0206 474/12 |
| 8,435,148 B2 * | 5/2013 | Moorman | ............... | F16D 48/0206 475/116 |
| 8,591,380 B2 * | 11/2013 | Kim | ............... | F16H 61/0206 477/130 |
| 9,188,218 B2 * | 11/2015 | Lundberg | ............... | F16H 61/0031 |
| 9,194,465 B2 * | 11/2015 | Lundberg | ............... | F16H 9/125 |
| 9,273,776 B2 * | 3/2016 | Kinoshita | ............... | F16H 61/0206 |
| 9,383,003 B2 * | 7/2016 | Lundberg | ............... | F16H 61/0021 |
| 2002/0060113 A1 * | 5/2002 | Harries | ............... | F16D 48/066 192/3.58 |
| 2002/0119864 A1 * | 8/2002 | Harries | ............... | F16H 61/2807 477/79 |
| 2003/0075408 A1 * | 4/2003 | Alfredsson | ............... | F16H 61/0025 192/3.25 |
| 2004/0063525 A1 * | 4/2004 | Ochiai | ............... | F16H 57/0434 474/28 |
| 2004/0102266 A1 * | 5/2004 | Bai | ............... | F16H 61/66259 474/18 |
| 2006/0094555 A1 * | 5/2006 | Long | ............... | F16H 61/12 475/116 |
| 2006/0105868 A1 * | 5/2006 | Moorman | ............... | F16H 61/66259 474/28 |
| 2006/0111207 A1 * | 5/2006 | Ogata | ............... | F16H 61/0021 474/28 |
| 2007/0135248 A1 * | 6/2007 | Kim | ............... | F16H 61/66272 474/28 |
| 2007/0175726 A1 * | 8/2007 | Combes | ............... | B60K 6/40 192/48.614 |
| 2008/0026887 A9 * | 1/2008 | Kim | ............... | F16H 61/66272 474/28 |
| 2008/0045378 A1 * | 2/2008 | Kim | ............... | F16H 61/66259 477/46 |
| 2008/0207392 A1 * | 8/2008 | Staudinger | ............... | F15B 13/07 477/34 |
| 2009/0264231 A1 * | 10/2009 | Ogata | ............... | F16H 61/12 474/11 |
| 2010/0255941 A1 * | 10/2010 | Ogata | ............... | F16H 61/0206 474/17 |
| 2010/0255942 A1 * | 10/2010 | Ogata | ............... | F16H 61/12 474/18 |
| 2013/0263586 A1 * | 10/2013 | Van Wijk | ............... | F16H 61/66272 60/459 |
| 2013/0319155 A1 * | 12/2013 | Berger | ............... | F16H 59/08 74/473.11 |
| 2013/0327172 A1 * | 12/2013 | Berger | ............... | F16H 59/045 74/473.11 |
| 2013/0333508 A1 * | 12/2013 | Lundberg | ............... | F16H 61/0021 74/473.11 |
| 2014/0123799 A1 * | 5/2014 | Landino | ............... | B60T 1/062 74/473.11 |
| 2015/0316149 A1 * | 11/2015 | Van Wijk | ............... | F16H 61/66272 474/28 |

* cited by examiner

HYDRAULIC CONTROL SYSTEM WITH ETRS FOR A CONTINUOUSLY VARIABLE TRANSMISSION

CROSS-REFERENCE TO RELATED APPLICATIONS

This application claims the benefit of U.S. Provisional Application No. 61/831,366 filed Jun. 5, 2013. The disclosure of the above application is incorporated herein by reference.

TECHNICAL FIELD

The invention relates to a control system for a continuously variable transmission, and more particularly to an electro-hydraulic control system having improved torque converter control, engine automatic stop/start, and electronic transmission range selection (ETRS) for a continuously variable transmission.

BACKGROUND

A typical continuously variable transmission (CVT) includes a hydraulic control system that is employed to provide cooling and lubrication to components within the CVT and to actuate torque transmitting devices such as drive clutches or torque converter clutches, and belt pulley positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices and the pulleys that move the belt of the CVT. The pressurized hydraulic fluid delivered to the pulleys is used to position the belt relative to input and output variators in order to obtain different gear ratios.

While previous hydraulic control systems are useful for their intended purpose, the need for new and improved hydraulic control system configurations within CVT's which exhibit improved performance, especially from the standpoints of efficiency, responsiveness and smoothness, is essentially constant. Accordingly, there is a need for an improved, cost-effective hydraulic control system for use in a hydraulically actuated CVT.

SUMMARY

A hydraulic control system for a CVT is provided. The hydraulic control system includes a pressure regulator subsystem, a ratio control subsystem, a torque converter control (TCC) subsystem, a clutch control subsystem, an ETRS subsystem, and is enabled for automatic engine start/stop (ESS) functionality.

In one example, a hydraulic control system for a continuously variable transmission, the transmission having a parking mechanism, a first torque transmitting device, a second torque transmitting device, a primary moveable pulley, and a secondary moveable pulley is provided. The hydraulic control system includes a pressure regulator subsystem providing a pressurized hydraulic fluid, a pulley ratio control subsystem in downstream fluid communication with the pressure regulator subsystem and configured to control the pressurized hydraulic fluid to the primary moveable pulley and the secondary moveable pulley, an enablement valve assembly in downstream communication with the pressure regulator subsystem, wherein the enablement valve assembly selective communicates the pressurized hydraulic fluid there through, a first mode valve assembly in downstream communication with the enablement valve assembly, and a second mode valve assembly in downstream communication with the first mode valve assembly. A first clutch actuator for selectively engaging a first torque transmitting device is in downstream fluid communication with the second mode valve assembly. A second clutch actuator for selectively engaging a second torque transmitting device is in downstream fluid communication with the second mode valve assembly. A park servo is in downstream fluid communication with both the first mode vale assembly and the second mode valve assembly, and the park servo is mechanically connected to the parking mechanism.

In another example, a first solenoid is in direct upstream communication with the first mode valve assembly, wherein a pressure signal from the first solenoid moves the first mode valve to the second position, and wherein a first biasing member biases the first mode valve towards the first position.

In yet another example, a second solenoid is in direct upstream communication with the second mode valve assembly, wherein a pressure signal from the second solenoid moves the second mode valve to the second position, and wherein a second biasing member biases the second mode valve towards the second position.

In yet another example, the pressure regulator subsystem includes an engine driven pump, a pressure regulator valve assembly in downstream fluid communication with the engine driven pump, a feed valve assembly in downstream fluid communication with the regulator valve assembly, and an accumulator.

In yet another example, the pressure regulator valve assembly includes a main inlet port that receives pressurized hydraulic fluid from the engine driven pump, a pressure regulator valve that controls the pressure of hydraulic fluid from the main inlet port to an outlet port in communication with the feed valve assembly and the accumulator.

In yet another example, the feed valve assembly is in upstream fluid communication with the enablement valve assembly.

In yet another example, an accumulator solenoid is disposed between the regulator valve assembly and the accumulator, and the accumulator solenoid and pressure regulator valve assembly are both in direct upstream fluid communication with the pulley ratio control subsystem.

In yet another example, the pulley ratio control subsystem includes a primary pulley valve in upstream fluid communication with the primary moveable pulley and a secondary pulley valve in upstream fluid communication with the secondary moveable pulley.

In yet another example, a primary pulley solenoid is in direct communication with the primary pulley valve for controlling a position of the primary pulley valve and a secondary pulley solenoid is in direct communication with the secondary pulley valve for controlling a position of the secondary pulley valve.

In yet another example, a pressure regulator solenoid is in direct communication with the pressure regulator valve for controlling a position of the pressure regulator valve.

In yet another example, a three-way check valve is in direct downstream fluid communication with the primary pulley solenoid and the secondary pulley solenoid, wherein the three-way check valve has an outlet that communicates with the pressure regulator valve and a higher pressure of the pressurized hydraulic fluid from the primary pulley solenoid and the secondary pulley solenoid controls the position of the pressure regulator valve.

In yet another example, the engine driven pump includes an outlet in communication with the pressure regulator valve assembly and with a bypass piston, a first inlet in communication with a sump, and a second inlet in communication with the bypass piston, wherein the bypass piston allows fluid communication from the outlet to the second inlet when a force acting on the bypass piston exceeds a threshold.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1A:
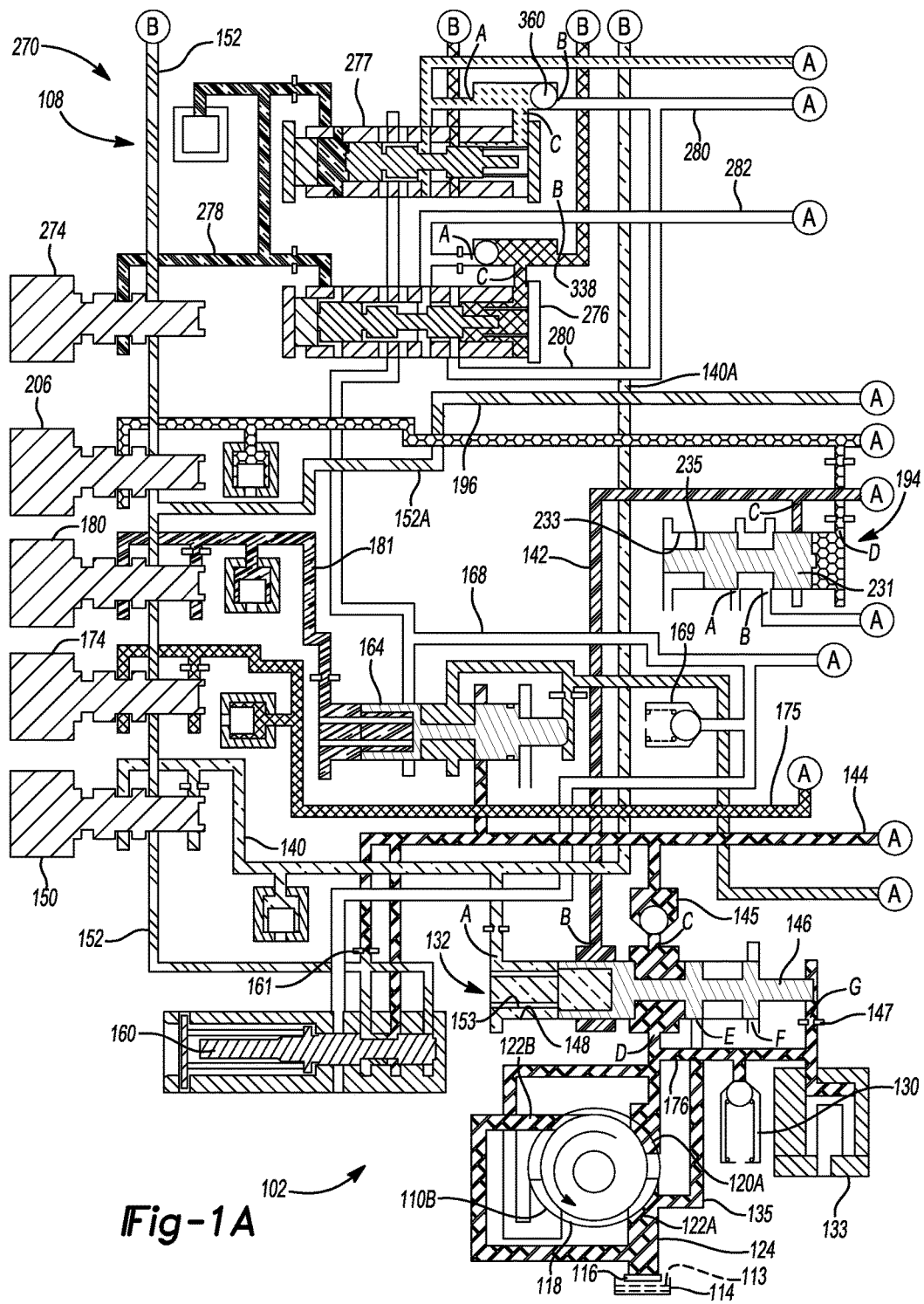
FIG. 1A is a diagram of a portion of a hydraulic control system according to the principles of the present invention.
Figure 1B:
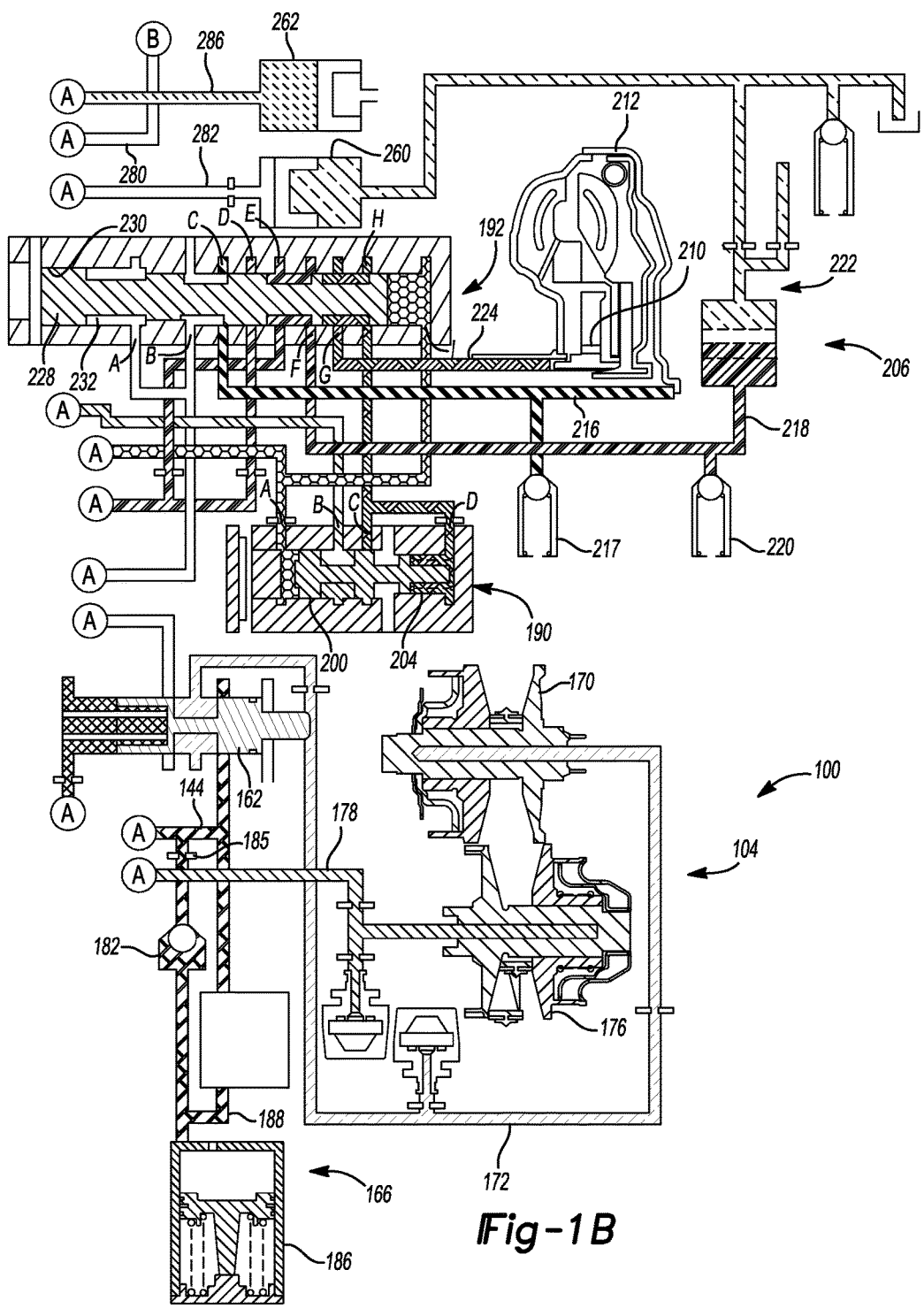
FIG. 1B is a diagram of another portion of the hydraulic control system according to the principles of the present invention.
Figure 1C:
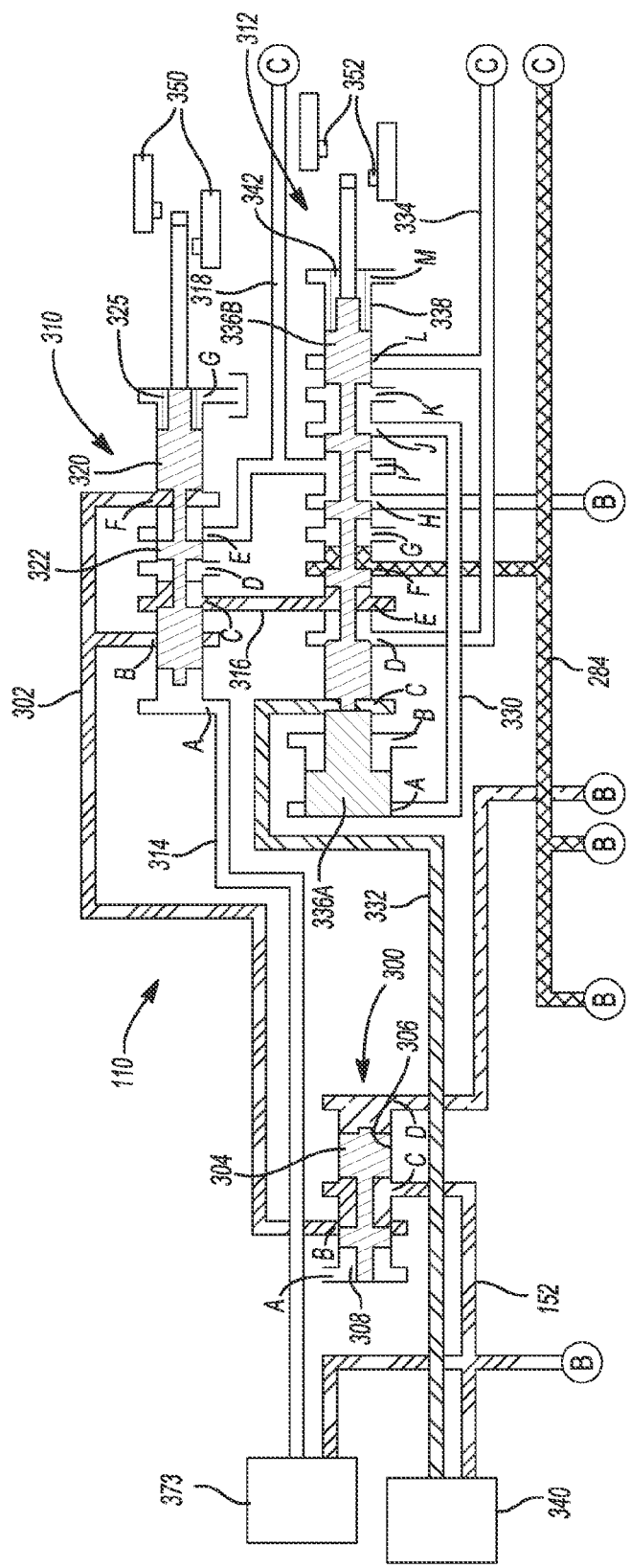
FIG. 1C is a diagram of another portion of the hydraulic control system according to the principles of the present invention.
Figure 1D:
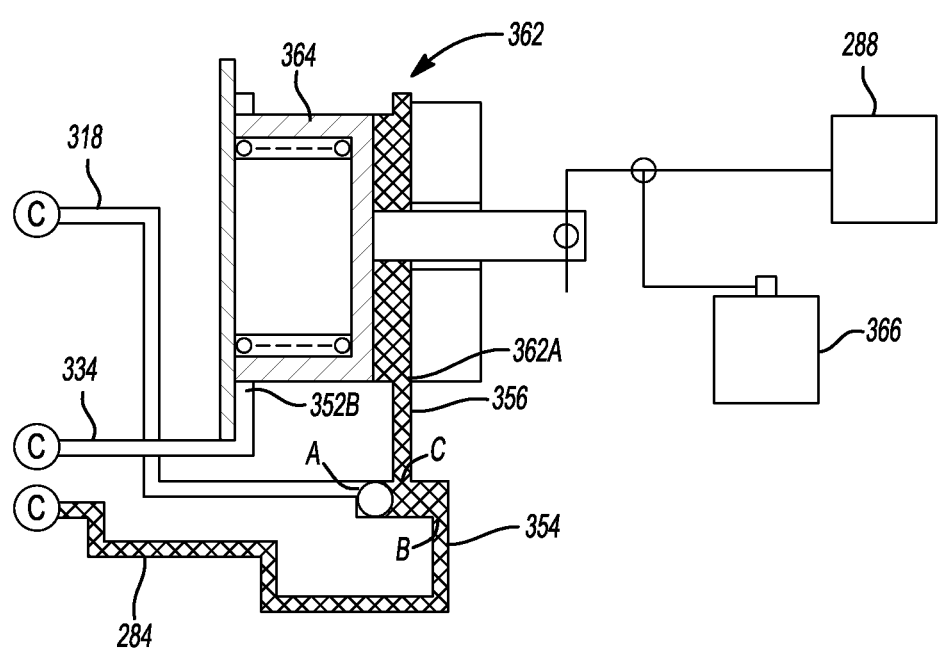
FIG. 1D is a diagram of another portion of the hydraulic control system according to the principles of the present invention.

With reference to FIG. 1, a hydraulic control system according to the principles of the present invention is generally indicated by reference number 100. The hydraulic control system 100 includes a plurality of interconnected or hydraulically communicating circuits or subsystems including a pressure regulator subsystem 102, a ratio control subsystem 104, a torque converter control (TCC) subsystem 106, a clutch control subsystem 108, and an electronic transmission range selection (ETRS) subsystem 110.

The pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) and may be, for example, a gear pump, a vane pump, a gerotor pump, or any other positive displacement pump. In one example, the pump 118 includes outlet ports 120A and 120B and an inlet ports 122A and 122B. The inlet ports 122A and 122B communicate with the sump 114 via a suction line 124. The outlet ports 120A and 120B communicate pressurized hydraulic fluid 113 to a supply line 126.

The supply line 126 communicates hydraulic fluid from the pump 118 to a spring biased blow-off safety valve 130, to a pressure regulator valve 132, and to an optional accumulator 133. The safety valve 130 is set at a relatively high predetermined pressure and if the pressure of the hydraulic fluid in the supply line 126 exceeds this pressure, the safety valve 130 opens momentarily to relieve and reduce the pressure of the hydraulic fluid.

The pressure regulator valve 132 is configured to bleed off pressure from the main supply line 126 to a return line 135. The return line 135 communicates with the suction line 124. The pressure regulator valve 132 includes ports 132A-G. Port 132A is in communication with a signal fluid line 140. Port 132B is in communication with a TCC feed line 142. Ports 132C is in communication with a main supply line 144 through a one-way check valve 145. Port 132D is in communication with the supply line 126. Port 132E is in communication with the bypass line 135. Port 132F is an exhaust port and is in communication with the sump 114 or an exhaust backfill circuit. Port 132G is in communication with the supply line 126 through a flow restriction orifice 147.

The pressure regulator valve 132 further includes a spool 146 slidably disposed within a bore 148. The pressure regulator valve 132 also provides hydraulic fluid to the TCC feed line 142. The spool 146 automatically changes position to dump excess flow from the supply line 126 to the TCC feed line 142 and then additional excess flow to the return line 135 until a pressure balance is achieved between a commanded pressure and the actual pressure. The spool 146 is modulated by a line pressure control solenoid 150 that communicates with the signal line 140. The line pressure control solenoid 150 receives hydraulic fluid from a solenoid feed line 152 and is preferably a low flow, normally high variable force solenoid. The solenoid 150 commands a fluid pressure by sending pressurized hydraulic fluid to port 132A to act on the spool 146. Simultaneously, fluid pressure from the main fluid line 126 enters port 132G and acts on the opposite side of the spool 146. Pressure balance between the commanded pressure from the solenoid 150, pressure within the main supply line 126 and a spring 153 is achieved as the spool 146 moves and allows selective communication between port 132D and port 132E and port 132D and port 132C and port 132D and port 132B. Under higher pressure from the pump 118, the pressure regulator valve fully strokes and pressure bleeds from port 132D to port 132B to feed the TCC subsystem 106 while fully opening to port 132E.

The main supply line 144 communicates hydraulic fluid from the pressure regulator valve 132 to an actuator feed limit valve 160, a first or primary pulley valve 162, a secondary pulley valve 164, and a ESS subsystem 166. The one way valve 145 prevents hydraulic flow into the main pump 118 when the main pump 118 is non-operational.

The actuator feed limit valve 160 is connected between the main supply line 144 and the solenoid feed line 152. The actuator feed limit valve 160 limits the maximum pressure of the hydraulic fluid supplied to the solenoid feed line 152 by selectively closing a direct connection between the main supply line 144 and the solenoid feed line 152 and forcing the main supply line 144 to communicate with the solenoid feed line 152 through a flow restriction orifice 161. The actuator feed limit valve 160 exhausts to a backfill circuit 168 that communicates with a blow-off valve 169. The blow-off valve 169 is set at a predetermined pressure and if the pressure of the hydraulic fluid in the backfill circuit 168 exceeds this pressure, the blow-off valve 169 opens momentarily to relieve and reduce the pressure of the hydraulic fluid.

The primary pulley valve 162 and the secondary pulley valve 164 form part of the ratio control subsystem 104. The primary pulley valve 162 selectively controls hydraulic fluid flow from the main supply line 144 to a primary pulley 170 via a primary pulley feed line 172. The primary pulley valve 162 is modulated by a primary pulley control solenoid 174 that communicates with a signal line 175. The primary pulley control solenoid 174 receives hydraulic fluid from the solenoid feed line 152 and is preferably a normally high variable force solenoid. The solenoid 172 commands a primary pulley position by sending pressurized hydraulic fluid to act on the primary pulley valve 162 which in turn controls the amount of hydraulic fluid from the main supply line to the primary pulley 170. The primary pulley valve 162 exhausts into the exhaust backfill circuit 168.

The secondary pulley valve 164 selectively controls hydraulic fluid flow from the main supply line 144 to a secondary pulley 176 via a secondary pulley feed line 178. The secondary pulley valve 164 is modulated by a secondary pulley control solenoid 180 that communicates with a signal line 181. The secondary pulley control solenoid 180 receives hydraulic fluid from the solenoid feed line 152 and is preferably a normally high variable force solenoid. The solenoid 180 commands a secondary pulley position by sending pressurized hydraulic fluid to act on the secondary pulley valve 164 which in turn controls the amount of hydraulic fluid from the main supply line to the secondary pulley 176. The secondary pulley valve 164 exhausts into the exhaust backfill circuit 168. Translation of the pulleys 170, 176 correlates to movement of a belt (not shown) in the CVT which varies the output or gear ratio of the CVT.

The ESS subsystem 166 provides hydraulic fluid pressure to the main supply line 144 during an automatic engine stop/start event where the engine is automatically shut off during certain operating conditions. During this event, the engine driven pump 118 is also shut off, thereby leading to a drop in pressure within the main supply line 144. The exhaust backfill circuit 168 minimizes the drain out of the main supply line 144. However, during engine restart, lag in pump operation can lead to unwanted shift delay. The ESS subsystem 166 assures immediate pressure to certain systems. The ESS subsystem 166 includes a one-way valve 182, an on/off solenoid 184, a flow restriction orifice 185, and an accumulator 186. The one-way valve 182 is connected to the main supply line 144 and to an accumulator line 188. The one-way valve 182 allows fluid flow from the main supply line 144 to the accumulator line 188. The on/off solenoid 184 is disposed in parallel with the one-way valve 182 and communicates between the main supply line 144 and the accumulator line 188. The on/off solenoid 184 opens to release the stored fluid within the accumulator 186. The accumulator 186 is connected to the accumulator line 188. The accumulator 186 is an energy storage device in which the non-compressible hydraulic fluid 113 is held under pressure by an external source. In the example provided, the accumulator 186 is a spring type or gas filled type accumulator having a spring or compressible gas or both that provides a compressive force on the hydraulic fluid 113 within the accumulator 186. However, it should be appreciated that the accumulator 186 may be of other types, such as a gas-charged type, without departing from the scope of the present invention. As noted above, the accumulator 186 is charged through the one-way valve 182 and orifice 185 during normal operation of the CVT. The accumulator 186 is released when the solenoid 184 is opened during the start phase of an engine stop/start event.

The TCC subsystem 106 includes a TCC regulator valve 190, a converter control valve 192, and a TCC fault valve 194. The TCC regulator valve 190 includes ports 190A-D. Port 190A communicates with a signal line 196. Port 190B communicates with a branch 152A of the solenoid supply line 152. Port 190C communicates with a converter feed line 198. Port 190D is the feedback port and communicates with converter feed line 198.

The TCC regulator valve 190 further includes a spool 200 slidably disposed within a bore 202. The spool 200 is biased (i.e. de-stroked) by a spring 204. The spool 200 automatically changes position to regulate flow from the solenoid supply line 152A to the converter feed line 198 until a pressure balance is achieved between a commanded pressure and the actual pressure. The commanded pressure is commanded by a TCC regulation solenoid 206. The spool 146 is modulated by the TCC regulation solenoid 206 that communicates a hydraulic fluid signal to the signal line 196. The TCC regulation solenoid 206 receives hydraulic fluid from the solenoid feed line 152 and is preferably a low flow, normally low variable force solenoid. The solenoid 206 commands a fluid pressure by sending pressurized hydraulic fluid to port 190A to act on the spool 200. Simultaneously, fluid pressure from the converter feed line 198 enters port 190D and acts on the opposite side of the spool 200. Pressure balance between the commanded pressure from the solenoid 206, pressure within the converter feed line 198 and the spring 204 is achieved as the spool 200 moves and allows selective communication between port 190B and 190C. It should be appreciated that solenoid 206 and valve 190 can become a single high flow, normally low variable force solenoid without departing from the scope of the present invention.

The TCC control valve 192 controls the engagement of a torque converter clutch 210 within a torque converter 212. The TCC control valve 192 includes ports 192A-I. Ports 192A and 192B communicate with a fault feed line 214. Port 192C communicates with a TCC release line 216. The TCC release line 216 communicates with a blow-off valve 217 and releases the torque converter clutch 210 when pressurized hydraulic fluid is received. Ports 192D and 192E communicate with parallel branches 142A and 142B of the TCC feed line 142. Port 192F communicates with a cooler line 218. The cooler line 218 communicates with a blow-off valve 220 and an oil cooler subsystem 222. Port 192G communicates with a TCC apply line 224. The TCC apply line 224 applies the torque converter clutch 210 when pressurized hydraulic fluid is received. Port 192H communicates with the converter feed line 198. Port 192I communicates with the signal line 196.

The TCC control valve 192 includes a spool 228 slidably disposed within a bore 230. The TCC control valve 192 is controlled by the TCC regulation solenoid 206 via the signal line 196. The TCC regulation solenoid 206 toggles the spool 228 between an "apply" and "release" state. In the "apply" state the spool 228 is moved to the left against the bias of a spring 232 and the apply line 224 is fed hydraulic fluid from the converter feed line 198 via communication of ports 192G and 192H. In the "apply" state port 192E communicates with port 192F to supply fluid from the feed line 142 to the cooler line 218 while port 192B exhausts the converter 210 through the fault feed line 214 and the fault valve 194.

In the "release" state the spool 228 is moved to the right (i.e. stroked by the spring 232) and port 192G communicates with port 192F to communicate the hydraulic fluid within the apply line 224 to the cooler line 218. In the "release" state port 192D communicates with port 192C to communicate hydraulic fluid from the converter feed line 142 to the release line 216 and port 192B is closed.

The TCC fault valve 194 assures that hydraulic fluid is provided to the release line to keep the torque converter 212 filled with hydraulic fluid. The TCC fault valve 194 includes ports 194A-D. Port 194A is an exhaust port that communicates with the sump 114. Port 192B communicates with the fault feed line 214. Port 194C communicates with a branch 142C of the converter feed line 142. Port 194D communicates with the signal line 196.

The TCC fault valve 194 includes a spool 231 slidably disposed within a bore 233. The position of the spool 231 is controlled by a signal received from the TCC regulation solenoid 206 via port 194D. The spool 231 moves between a first position and a second position. In the first position the spool 231 is moved to the right by the bias of a spring 235 and port 194C allows fluid communication between the converter feed line 142 and the fault line 214, thereby pressurizing the converter assuring that hydraulic fluid is available to the release line 218 in the unlikely event that the spool 228 of the TCC control valve 192 sticks in the "apply" state. In the second position the spool 231 is moved to the left against the bias of the spring 235 and port 194C is closed and 194A is open to exhaust. By opening exhaust port 194A, fluid is exhausted from the converter feed line 142.

The clutch control subsystem 108 controls engagement of a Drive clutch actuator 260 and a Reverse clutch actuator 262. The Drive clutch actuator 260 and the Reverse clutch actuator 262 are controlled by a solenoid valve assembly 270 and the ETRS subsystem 110. The solenoid valve assembly 270 includes a clutch control solenoid 274 which positions a Drive regulator valve 276 and a Reverse regulator valve 277. The solenoid 274 receives hydraulic fluid from the solenoid supply line 152 and is connected to a signal line 278. The signal line communicates with both the Drive regulator valve 276 and the Reverse regulator valve 277. The clutch control solenoid 274 is preferably a low flow, normally low variable flow solenoid. The solenoid 274 selectively communicates the oil to the signal line 278 in order to move the Drive regulator valve 276 and the Reverse regulator valve 277. The Drive regulator valve 276 selectively communicates hydraulic fluid from a Drive signal line 280 to a feed line 282. The Reverse regulator valve 277 selectively communicates hydraulic fluid from a Reverse signal line 284 to a feed line 286. It should be appreciated that solenoid 275 and valves 276, 277 can become a single high flow, normally low variable force solenoid without departing from the scope of the present invention.

The ETRS subsystem 110 connects the pressure regulator subsystem 102 via the solenoid supply line 152 with the clutch control subsystem 108 via the Drive signal line 280 and the Reverse signal line 284. Generally, the ETRS control subsystem 110 converts electronic input for a requested range selection (Drive, Reverse, Park) into hydraulic and mechanical commands. The mechanical commands include engaging and disengaging a park mechanism 288.

The ETRS control subsystem 110 includes an enablement valve assembly 300. The enablement valve assembly includes fluid ports 300A-D. Fluid port 300A is an exhaust port that communicates with the sump 114 or an exhaust backfill circuit. Fluid port 300B communicates with a range feed line 302. Fluid port 300C communicates with the solenoid supply line 152. Fluid port 300D communicates with a branch 140A of the signal line 140. The enablement valve assembly 300 further includes a spool valve 304 is slidably disposed within a bore 306. When pressurized fluid is supplied through the signal line 140A, fluid pressure acts upon the spool valve 304 through the fluid port 300D and moves the spool valve 304 against a spring 308 into a stroked position, by way of example. The spool valve 304 is actuated to a de-stroked position by the spring 308. When the spool valve 304 is stroked, the fluid port 300C communicates with the fluid port 300B.

The ETRS subsystem 110 further includes first and second mode valve assemblies 310, 312 that communicate in series with one another and with the enablement valve assembly 300. The first mode valve 310 includes ports 310A-G, numbered consecutively from left to right. Ports 310D and 310G are exhaust ports that communicate with the sump 114 or an exhaust backfill circuit. Ports 300B and 300F communicate with the range feed line 302. Port 310A communicates with a signal line 314. Port 310C communicates with a fluid line 316. Port 310E communicates with a fluid line 318.

The first mode valve assembly 310 further includes a spool valve 320 slidably disposed within a bore 322. The spool valve 320 is controlled by a first mode valve control solenoid 323 via the signal line 314. The first mode valve control solenoid 323 toggles the spool 320 between a "first" and a "second" state. In the "first" state the spool 320 is moved to the right against the bias of a spring 325 and port 310C exhausts to port 310D while port 310F communicates with port 310E. This allows fluid flow from the range feed line 302 to the fluid line 318. When the first mode valve assembly 310 is in the "second" state, port 310B communicates with port 310C, port 310E exhausts to port 310D, and port 310F is closed. This allows fluid from the range feed line 302 to communicate with the fluid line 316.

The second mode valve assembly 312 generally includes ports 312A-M. Ports 312B, 312G, 312K and 312M are exhaust ports that communicate with the sump 114 or an exhaust backfill circuit. Port 312A communicates with a feedback line 330 which is connected to port 312J. Port 312C communicates with a signal line 332. Port 312D communicates with a Park feed line 334 which is connected to port 312L. Port 312E communicates with the fluid line 316. Port 312F communicates with the Reverse line 284. Port 312H communicates with the Drive line 280. Port 312I communicates with the fluid line 318. Port 312J communicates with the feedback line 330. Port 312L communicates with the Park feed line 334.

The second mode valve assembly 312 includes spool valves 336A and 336B slidably disposed within a bore 338. The spool valve 336A acts as a latch to position spool valve 336B. Spool valve 336B is controlled by a second mode valve control solenoid 340 via the signal line 332. The second mode valve control solenoid 340 toggles the spool 336B between a "first" and a "second" state. In the "first" state the spool 336B is moved to the right against the bias of a spring 342 and port 312E communicates with port 312F, port 312I communicates with port 312J. In the "second" state the spool 336B is de-stroked to the left and port 312E communicates with port 312D and port 312I communicates with port 312H.

The first mode valve assembly 310 may include a pair of position sensors 350, and the second mode valve assembly 312 may include a pair of position sensors 352, by way of example. It should be appreciated that a single position sensor may be used on mode valve assemblies 310 and 312 or the positions sensors omitted without departing from the scope of the invention.

A check valve 354 is connected between fluid line 318 and the Reverse fluid line 284. The check valve 354 includes three ports 354A-C. The check valve 354 closes off whichever of the ports 354A and 354B that is delivering the lower hydraulic pressure and provides communication between whichever of the ports 354A and 354B having or delivering the higher hydraulic pressure and the outlet port 354C. Port 354A is connected to the fluid line 318. Port 354B is connected to the Reverse fluid line 284. Port or outlet 354C is connected to an out-of-Park (OOP) fluid line 356.

A check valve 358 is connected between the Drive feed line 282 and the Reverse fluid line 284. The check valve 358 includes three ports 358A-C. The check valve 358 closes off whichever of the ports 358A and 358B that is delivering the lower hydraulic pressure and provides communication between whichever of the ports 358A and 358B having or delivering the higher hydraulic pressure and the outlet port 358C. Port 358A is connected to the Drive feed line 282. Port 358B is connected to the Reverse fluid line 284. Port or outlet 358C is connected to Drive regulator valve 276.

A check valve 360 is connected between the Drive fluid line 280 and the Reverse feed line 286. The check valve 360 includes three ports 360A-C. The check valve 360 closes off whichever of the ports 360A and 360B that is delivering the lower hydraulic pressure and provides communication between whichever of the ports 360A and 360B having or delivering the higher hydraulic pressure and the outlet port 360C. Port 360A is connected to the Reverse feed line 286. Port 360B is connected to the Drive fluid line 280. Port or outlet 360C is connected Reverse regulator valve 277.

The Park fluid line 334 and the OOP fluid line 356 each communicate with a Park servo valve 362. The Park servo valve 362 includes ports 362A and 362B each located on either side of a piston 364. The piston 364 is mechanically coupled to the park mechanism 288. Port 362A communicates with the OOP fluid line 356 and port 362B communicates with the into-Park fluid line 334. The piston 364 moves upon contact by the hydraulic fluid supplied by one of the fluid lines 334, 356, thereby mechanically disengaging or engaging the Park mechanism 288.

The Park mechanism 288 is connected with a Park Inhibit Solenoid Assembly (PISA) 366. The PISA 366 is actuatable to mechanically prevent the Park mechanism 288 from engaging during an engine stop-start event (i.e. when the vehicle is intended to be mobile during an automatic engine stop).

When the first mode valve 310 is supplied hydraulic fluid by the enablement valve 300, the first mode valve 310 either supplies hydraulic fluid to fluid line 316 or fluid line 318. Hydraulic fluid communicated to fluid line 316 is then directed by the position of the second mode valve 312. Hydraulic fluid communicated to fluid line 318 communicates through the check valve 354 and moves the servo 362 to the out-of-Park position. When the second mode valve 312 is supplied hydraulic fluid from fluid line 316, the second mode valve 312 either communicates the hydraulic fluid to the Park line 334, which moves the servo 362 to the Park position, or to the Reverse fluid line 284 which communicates through the check valve 354 and moves the servo 362 to the out-of-Park position. Hydraulic fluid provided to the Reverse fluid line 284 also feeds the Reverse regulator valve 277 which can selectively actuate the Reverse clutch 262. Meanwhile, hydraulic fluid delivered to fluid line 318 also is selectively delivered to the Drive fluid line 280 through the second mode valve 312. Hydraulic fluid provided to the Drive fluid line 280 also feeds the Drive regulator valve 276 which can selectively actuate the Drive clutch 260.

Figure 2:
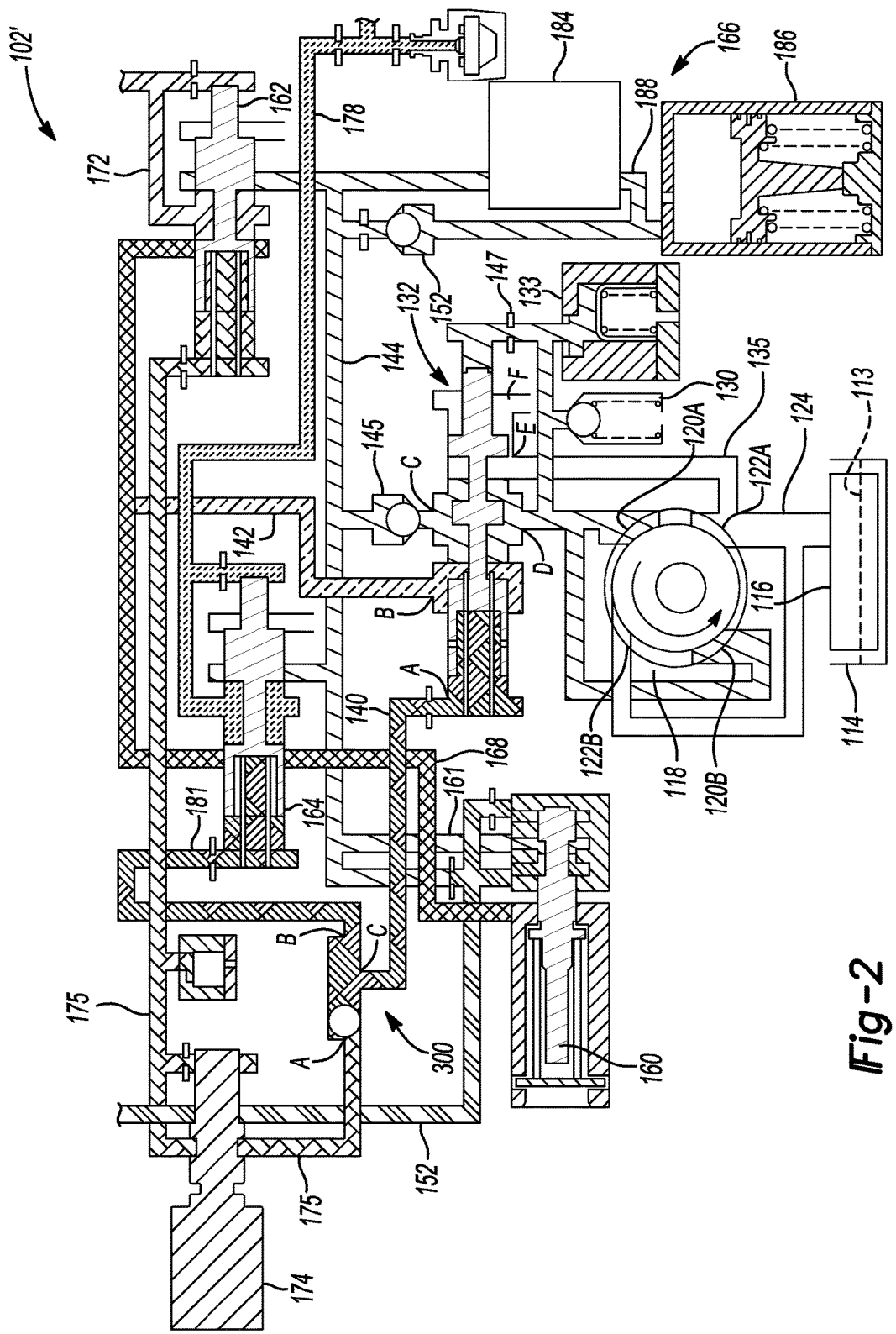
FIG. 2 is a diagram of a portion of an alternate embodiment of the hydraulic control system according to the principles of the present invention.

Turning now to FIG. 2, an alternate pressure regulator subsystem is generally indicated by reference number 102'. The pressure regulator subsystem 102' shares common components with the pressure regulator subsystem 102 shown in FIG. 1 and therefore like components have been indicated by like reference numbers. However, in the pressure regulator subsystem 102', the line pressure control solenoid 150 shown in FIG. 1 has been replaced by a check valve 390. The check valve 390 has ports 390A-C. Port 390A communicates with the signal line 175 either directly or through the primary pulley control solenoid 174. Port 390B communicates with the signal line 181 or the secondary pulley control solenoid 180. Port 390C communicates with the signal line 140. The check valve 390 allows fluid communication from either port 390A and 390B, whichever provides the higher pressure, to port 390C. Therefore, a commanded pressure of the pressure regulator valve 132 is controlled by the pressure signal from either of the primary pulley solenoid 174 or the secondary pulley solenoid 180.

Figure 3:
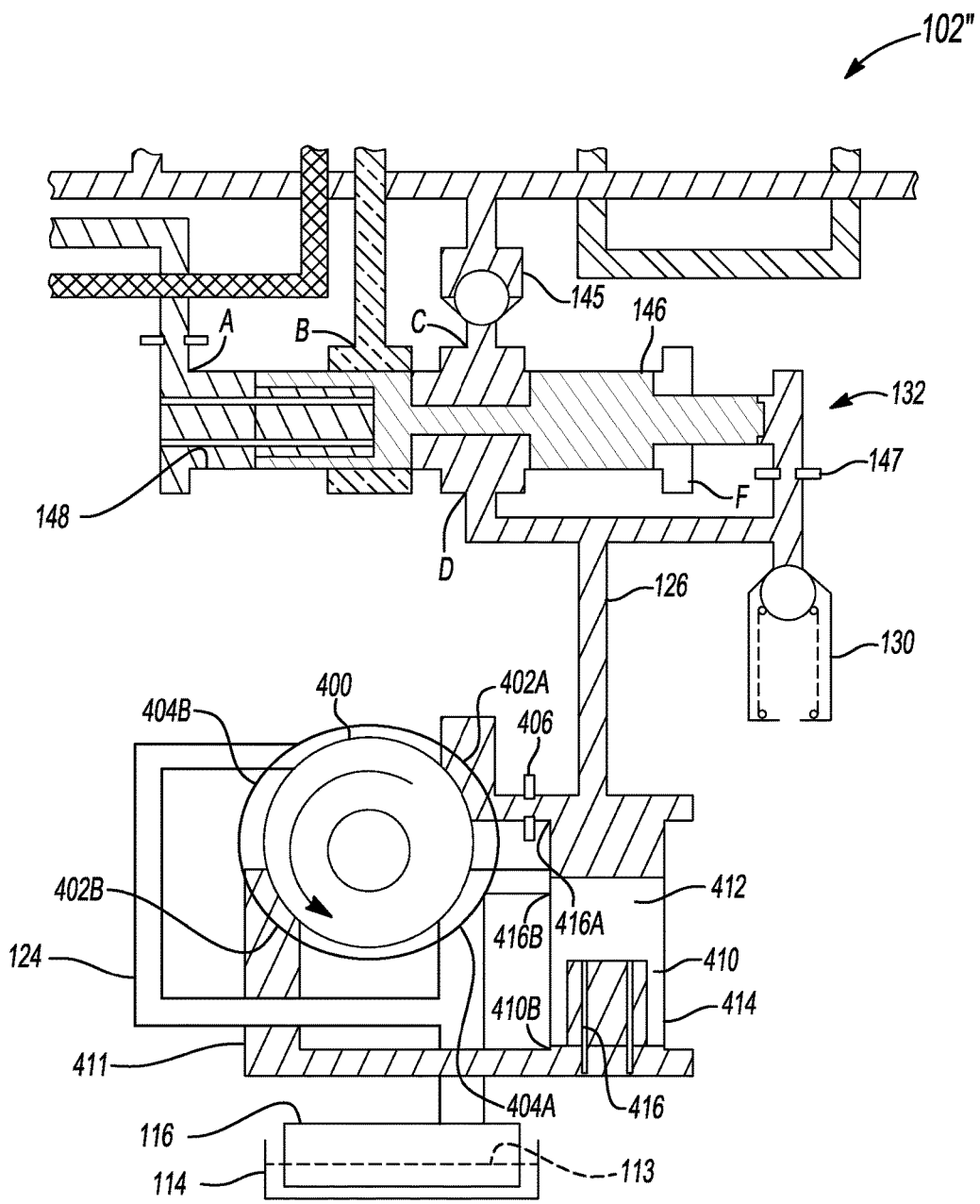
FIG. 3 is a diagram of a portion of another alternate embodiment of the hydraulic control system according to the principles of the present invention.

With reference to FIG. 3, another embodiment of a pressure regulator subsystem is generally indicated by reference number 102". The pressure regulator subsystem 102" shares common components with the pressure regulator subsystem 102 shown in FIG. 1 and therefore like components have been indicated by like reference numbers. However, in the pressure regulator subsystem 102", the return line 135 has been removed along with port 132E of the pressure regulator valve 132 and an alternate pump 400 is connected to the supply line 126. The pump 400 includes outlet ports 402A and 402B and inlet ports 404A and 404B. The inlet ports 404A and 404B communicate with the sump 114 via the suction line 124. The outlet port 402A and 402B communicates through an orifice 406 to the supply line 126 and a release valve 410.

The release valve 410 includes a first inlet 410A, a second inlet 410B, and an outlet 410C. The first inlet 410A communicates with the supply line 126 and the outlet port 402A. The second inlet 410B communicates with the outlet port 402B via a signal line 411. The outlet 410C communication with the suction line 124. A piston 412 is slidably disposed within a bore 414 in the release valve 410. The first inlet 410A communicates with an opposite side of the piston 412 than the second inlet 410B. The outlet 410C is disposed between the first and second inlets 410A and 410B. A spring 416 biases the piston 412 towards the first inlet 410A.

When a force acting on the piston 412 by pressurized hydraulic fluid from the outlet 402A is greater than a combined force acting on the piston 412 by pressurized hydraulic fluid from the outlet 402B and the spring 416, the piston isolates the outlet 410C. As these forces balance, the piston 412 moves and selectively opens the outlet 410C to the first inlet 410A, thereby dumping hydraulic fluid back into the suction line 124 until a balance of forces exist on the piston 412.

It should be appreciated that other orifice and check ball arrangements can be used without departing from the scope of present invention, including a single orifice for fill and exhaust, or filling through a single orifice and exhausting through two orifices. Likewise while individual fluid lines have been described, it should be appreciated that fluid lines, flow paths, passageways, etc., may contain other shapes, sizes, cross-sections, and have additional or fewer branches without departing from the scope of the present invention.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a continuously variable transmission, the transmission having a parking mechanism, a first torque transmitting device, a second torque transmitting device, a primary moveable pulley, and a secondary moveable pulley, the hydraulic control system comprising:
 a pressure regulator subsystem providing a pressurized hydraulic fluid;
 a pulley ratio control subsystem in downstream fluid communication with the pressure regulator subsystem and configured to control the pressurized hydraulic fluid to the primary moveable pulley and the secondary moveable pulley;
 an enablement valve assembly in downstream communication with the pressure regulator subsystem, wherein the enablement valve assembly selective communicates the pressurized hydraulic fluid there through;
 a first mode valve assembly in downstream communication with the enablement valve assembly;
 a second mode valve assembly in downstream communication with the first mode valve assembly;
 a first clutch actuator for selectively engaging a first torque transmitting device, the first clutch actuator in downstream fluid communication with the second mode valve assembly;
 a second clutch actuator for selectively engaging a second torque transmitting device, the second clutch actuator in downstream fluid communication with the second mode valve assembly;
 a park servo in downstream fluid communication with both the first mode valve assembly and the second mode valve assembly, the park servo mechanically connected to the parking mechanism.

2. The hydraulic control system of claim 1 further comprising a first solenoid in direct upstream communication with the first mode valve assembly, wherein a pressure signal from the first solenoid moves the first mode valve to the second position, and wherein a first biasing member biases the first mode valve towards the first position.

3. The hydraulic control system of claim 2 further comprising a second solenoid in direct upstream communication with the second mode valve assembly, wherein a pressure signal from the second solenoid moves the second mode valve to the second position, and wherein a second biasing member biases the second mode valve towards the second position.

4. The hydraulic control system of claim 1 wherein the pressure regulator subsystem includes an engine driven pump, a pressure regulator valve assembly in downstream fluid communication with the engine driven pump, a feed valve assembly in downstream fluid communication with the regulator valve assembly, and an accumulator.

5. The hydraulic control system of claim 4 wherein the pressure regulator valve assembly includes a main inlet port that receives pressurized hydraulic fluid from the engine driven pump, a pressure regulator valve that controls the pressure of hydraulic fluid from the main inlet port to an outlet port in communication with the feed valve assembly and the accumulator.

6. The hydraulic control system of claim 5 wherein the feed valve assembly is in upstream fluid communication with the enablement valve assembly.

7. The hydraulic control system of claim 6 further comprising an accumulator solenoid disposed between the regulator valve assembly and the accumulator, and wherein the accumulator solenoid and pressure regulator valve assembly are both in direct upstream fluid communication with the pulley ratio control subsystem.

8. The hydraulic control system of claim 7 wherein the pulley ratio control subsystem includes a primary pulley valve in upstream fluid communication with the primary moveable pulley and a secondary pulley valve in upstream fluid communication with the secondary moveable pulley.

9. The hydraulic control system of claim 8 further comprising:
 a primary pulley solenoid in direct communication with the primary pulley valve for controlling a position of the primary pulley valve; and
 a secondary pulley solenoid in direct communication with the secondary pulley valve for controlling a position of the secondary pulley valve.

10. The hydraulic control system of claim 9 further comprising a pressure regulator solenoid in direct communication with the pressure regulator valve for controlling a position of the pressure regulator valve.

11. The hydraulic control system of claim 10 further comprising a three-way check valve in direct downstream fluid communication with the primary pulley solenoid and the secondary pulley solenoid, wherein the three-way check valve has an outlet that communicates with the pressure regulator valve and a higher pressure of the pressurized hydraulic fluid from the primary pulley solenoid and the secondary pulley solenoid controls the position of the pressure regulator valve.

12. The hydraulic control system of claim 10 wherein the engine driven pump includes an outlet in communication with the pressure regulator valve assembly and with a bypass piston, a first inlet in communication with a sump, and a second inlet in communication with the bypass piston, wherein the bypass piston allows fluid communication from the outlet to the second inlet when a force acting on the bypass piston exceeds a threshold.

13. A hydraulic control system for a continuously variable transmission, the transmission having a parking mechanism, a first torque transmitting device, a second torque transmitting device, a primary moveable pulley, and a secondary moveable pulley, the hydraulic control system comprising:
 a pressure regulator subsystem providing a pressurized hydraulic fluid;
 a pulley ratio control subsystem in downstream fluid communication with the pressure regulator subsystem and configured to control the pressurized hydraulic fluid to the primary moveable pulley and the secondary moveable pulley;
 an enablement valve assembly in downstream communication with the pressure regulator subsystem;
 a range feed line connected to the enablement valve assembly, wherein the enablement valve assembly selective communicates the pressurized hydraulic fluid to the range feed line;
 a first mode valve assembly having at least one input connected to the range feed line, a first outlet port, and a second outlet port, the first mode valve assembly having a first mode valve moveable between a first position and a second position, wherein the range feed line communicates with the second outlet port when in the first position and wherein the range feed line communicates with the first outlet port when in the second position;

a second mode valve assembly having a first inlet port in communication with the first outlet port of the first mode valve assembly, a second inlet port in communication with the second outlet port of the first mode valve assembly, a Park feed port, a Reverse feed port, and a Drive feed port, the second mode valve assembly having a second mode valve moveable between a first position and a second position, wherein the first inlet port communicates with the Park feed port when the second mode valve is in the first position and wherein the first inlet port communicates with the Reverse feed port and the second inlet port communicates with the Drive feed port when the second mode valve is in the second position;

a first clutch actuator for selectively engaging the first torque transmitting device, the first clutch actuator in downstream fluid communication with Drive feed port of the second mode valve assembly;

a second clutch actuator for selectively engaging the second torque transmitting device, the second clutch actuator in downstream fluid communication with the Reverse feed actuator of the second mode valve assembly;

a park servo in communication with the Park feed port of the second mode valve assembly, the Reverse feed port of the second mode valve assembly, and the second outlet port of the first mode valve assembly, the park servo mechanically connected to the parking mechanism.

14. The hydraulic control system of claim 13 wherein the park servo includes a piston connected to the parking mechanism, a Park port disposed on a first side of the piston, and an out-of-Park port disposed on an opposite side of the piston, wherein the Park port is in communication with the Park feed port of the second mode valve assembly and the out-of-Park port is in communication with the Reverse feed port of the second mode valve assembly and the second outlet port of the first mode valve assembly.

15. The hydraulic control system of claim 14 further comprising a three way valve disposed between the out-of-Park port, the Reverse feed port of the second mode valve assembly, and the second outlet port of the first mode valve assembly, wherein the three way valve allows selective communication between the Reverse feed port of the second mode valve assembly or the second outlet port of the first mode valve assembly and the out-of-Park port.

16. The hydraulic control system of claim 15 further comprising a Park inhibit solenoid assembly connected to the parking mechanism, wherein the Park inhibit solenoid assembly is actuatable to mechanically prevent the parking mechanism from engaging during an engine stop-start event.

17. The hydraulic control system of claim 13 wherein the pressure regulator subsystem includes an engine driven pump, a pressure regulator valve assembly in downstream fluid communication with the engine driven pump, a feed valve assembly in downstream fluid communication with the regulator valve assembly, and an accumulator.

18. The hydraulic control system of claim 17 wherein the enablement valve assembly includes an inlet port in communication with the feed valve assembly, an outlet port connected to the range feed line, and a signal port in communication with a pressure regulator control solenoid, the enablement valve assembly having an enablement valve moveable between a first position and a second position, wherein the inlet port is in communication with the outlet port when the enablement valve is in the first position, and wherein the inlet port is not in communication with the outlet port when the enablement valve is in the second position.

19. The hydraulic control system of claim 18 wherein the pressure regulator solenoid moves the enablement valve to the first position and is in communication with the pressure regulator valve assembly.

20. The hydraulic control system of claim 13 further comprising an accumulator solenoid disposed between the regulator valve assembly and the accumulator, and wherein the accumulator solenoid and pressure regulator valve assembly are both in direct upstream fluid communication with the pulley ratio control subsystem.

* * * * *